(12) United States Patent  (10) Patent No.: US 8,896,446 B2
Cusack, Jr.  (45) Date of Patent: Nov. 25, 2014

(54) DEVICE AND SYSTEM FOR ELECTRONIC ACCESS CONTROL AND SURVEILLANCE

(71) Applicant: Francis John Cusack, Jr., Raleigh, NC (US)

(72) Inventor: Francis John Cusack, Jr., Raleigh, NC (US)

( * ) Notice: Subject to any disclaimer, the term of this patent is extended or adjusted under 35 U.S.C. 154(b) by 0 days.

(21) Appl. No.: 14/102,026

(22) Filed: Dec. 10, 2013

(65) Prior Publication Data

US 2014/0098235 A1  Apr. 10, 2014

Related U.S. Application Data

(63) Continuation of application No. 12/261,201, filed on Oct. 30, 2008, now Pat. No. 8,624,733.

(60) Provisional application No. 61/001,544, filed on Nov. 5, 2007.

(51) Int. Cl.
| | |
|---|---|
| G08B 13/00 | (2006.01) |
| G08B 13/08 | (2006.01) |
| E05B 45/06 | (2006.01) |
| G08B 19/00 | (2006.01) |
| G05B 19/00 | (2006.01) |
| G06K 9/00 | (2006.01) |
| H04N 7/18 | (2006.01) |
| G07C 9/00 | (2006.01) |

(52) U.S. Cl.
CPC .............. *H04N 7/18* (2013.01); *G07C 9/00103* (2013.01); *G07C 9/00158* (2013.01); *G07C 9/00166* (2013.01); *G07C 9/00007* (2013.01)
USPC ......... 340/541; 340/545.1; 340/542; 340/5.1; 340/5.2; 382/103; 348/61

(58) Field of Classification Search
USPC ......................................................... 340/541
See application file for complete search history.

(56) References Cited

U.S. PATENT DOCUMENTS 6,226,388 B1 * 5/2001 Qian et al. .................... 382/103
6,570,498 B1   5/2003 Frost et al.
(Continued)

OTHER PUBLICATIONS

VideoIQ® iCVR™; The World's First Network Camera with Built-in Intelligent Detection, Object Search and Content Aware Storage; 6 pages; Bedford, MA, USA.

(Continued)

*Primary Examiner* — Jennifer Mehmood
*Assistant Examiner* — Pameshanand Mahase
(74) *Attorney, Agent, or Firm* — Schmeiser, Olsen & Watts LLP

(57) ABSTRACT

Described is a device for electronic access control (EAC) and surveillance. The device includes an EAC module and an imager integrated in a single unit. The EAC module controls physical access through a secure portal and the imager maintains surveillance of an observation area near the portal. A data signal is provided at a data port proximate to the EAC module and imager. The data signal includes EAC data for the portal, image or video data of the observation area and optional audio data. The device can be configured to communicate with a remote server and database over an IP data network. The device can also include one or more analytical modules for real-time computation and processing of data and generation of metadata for transmission over the data network. Correlating and combining current and historical data from multiple devices results in powerful real time threat detection and forensic search capability.

27 Claims, 10 Drawing Sheets

Integrated EAC & CCTV IP Device with
On Board Video and Data Storage

(56) References Cited

U.S. PATENT DOCUMENTS

| | | | |
|---|---|---|---|
| 6,696,945 B1 * | 2/2004 | Venetianer et al. | 340/541 |
| 6,917,902 B2 | 7/2005 | Alexander | |
| 6,972,660 B1 | 12/2005 | Montgomery et al. | |
| 2002/0094111 A1 * | 7/2002 | Puchek et al. | 382/115 |
| 2003/0190076 A1 | 10/2003 | DeLean | |
| 2004/0240542 A1 | 12/2004 | Yeredor et al. | |
| 2005/0219360 A1 | 10/2005 | Cusack et al. | |
| 2006/0028488 A1 * | 2/2006 | Gabay et al. | 345/626 |
| 2007/0291118 A1 | 12/2007 | Shu et al. | |
| 2008/0218591 A1 | 9/2008 | Heier et al. | |
| 2008/0273088 A1 | 11/2008 | Shu et al. | |

OTHER PUBLICATIONS

HID Access; "EdgeReader™ ERP40—IP Intelligence at the Door with Integrated multiCLASS™ Reader for Host Systems 82125B"; Assa Abloy Group; Mar. 2008.

* cited by examiner

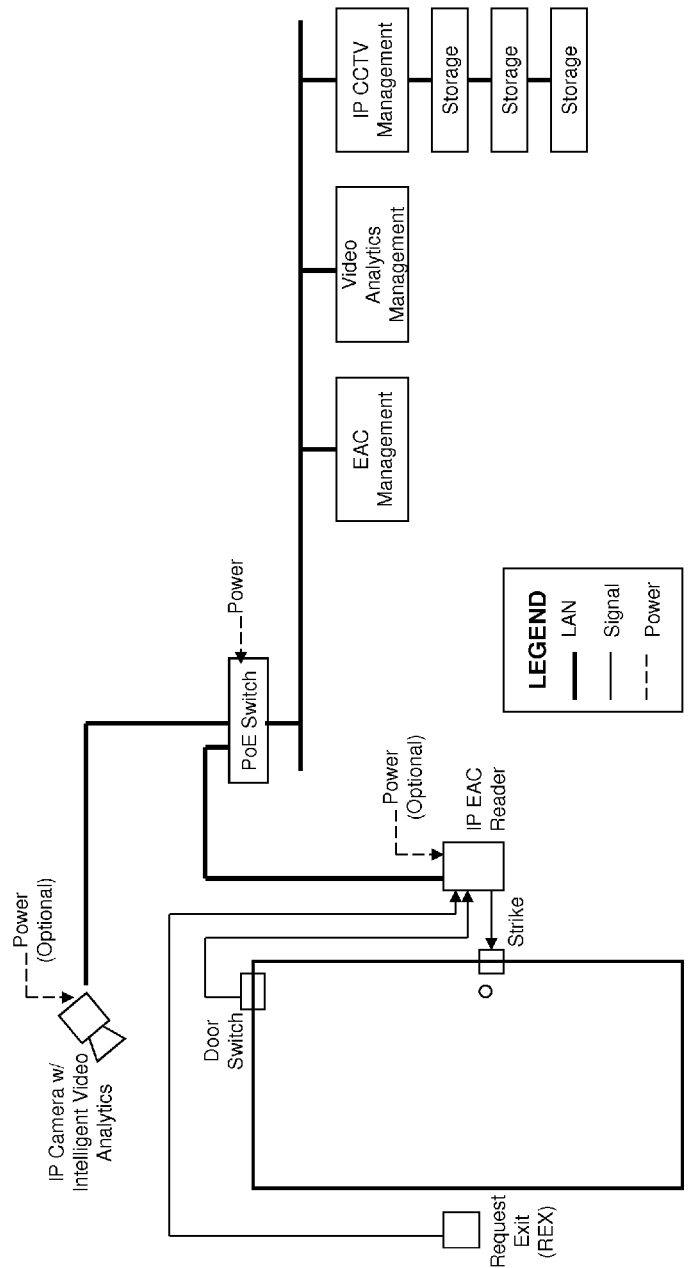

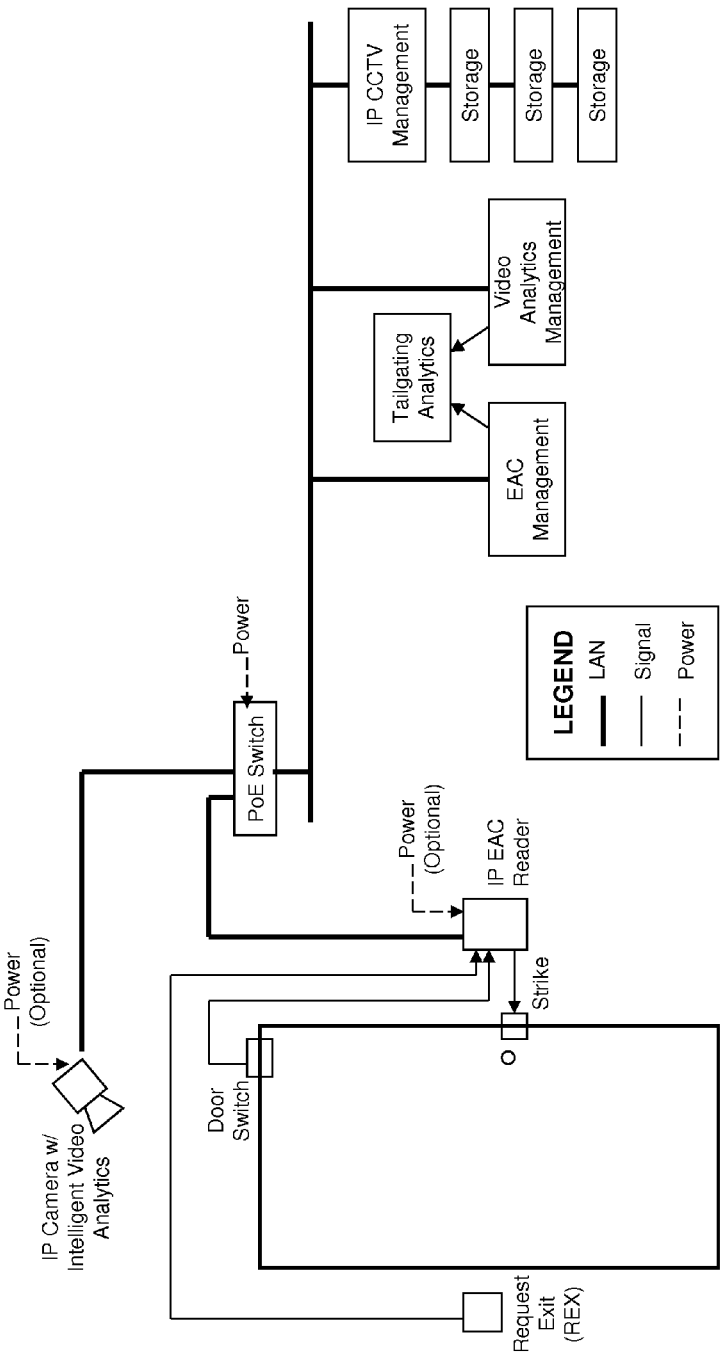

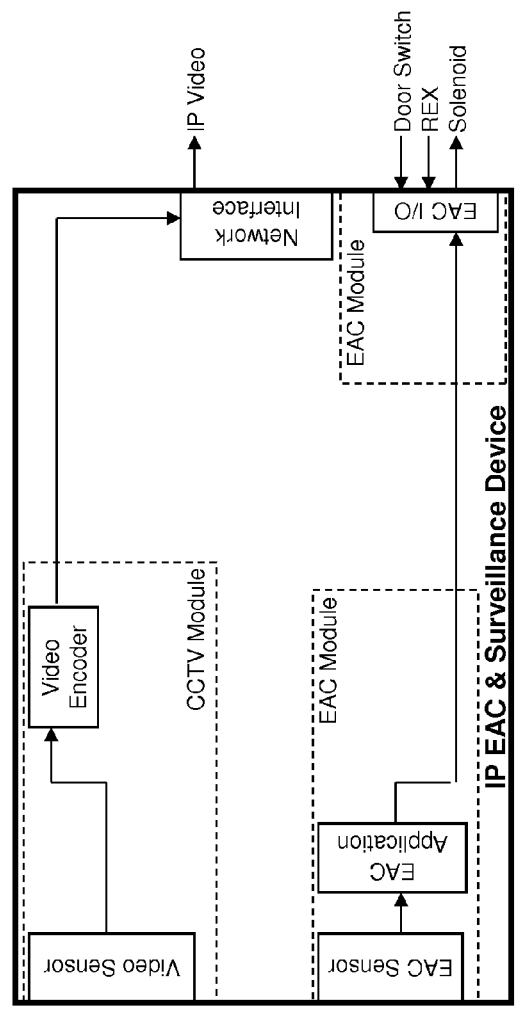
Figure Three
*IP Device with Integrated EAC and CCTV Surveillance Capabilities*

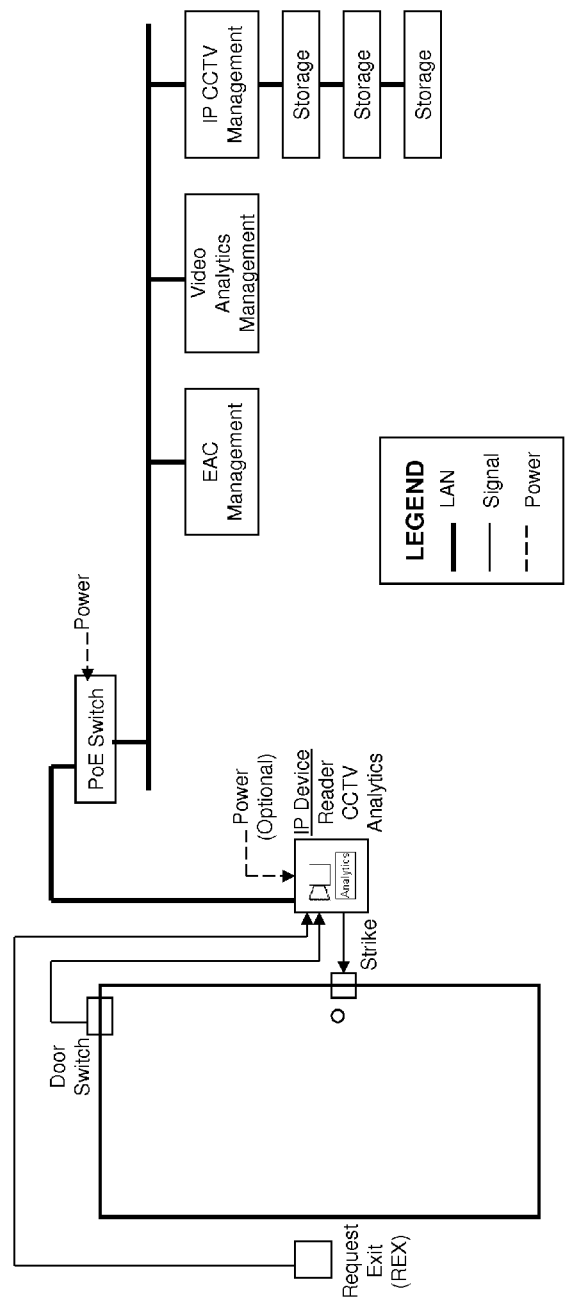

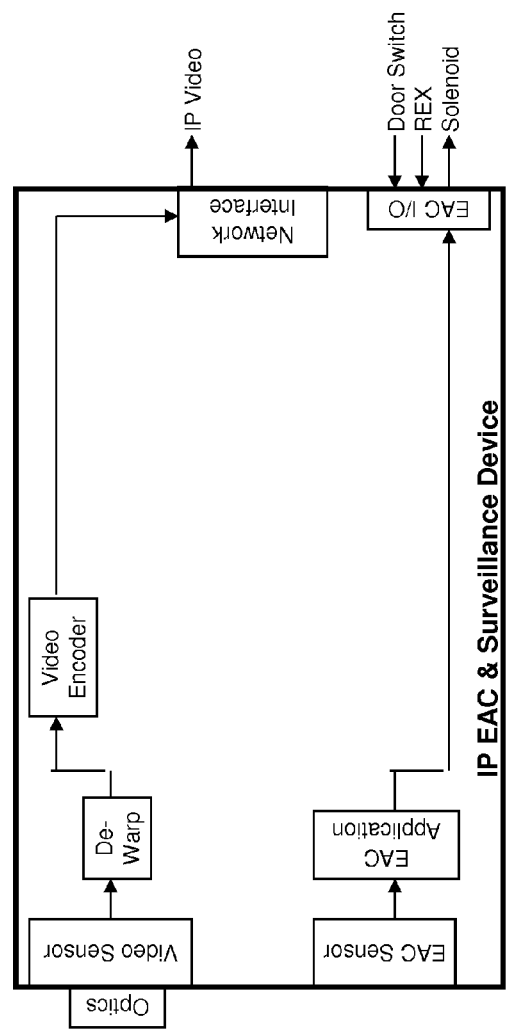
Figure Five
*Integrated EAC & CCTV IP Device with Immersive Imaging and De-Warping Capability*

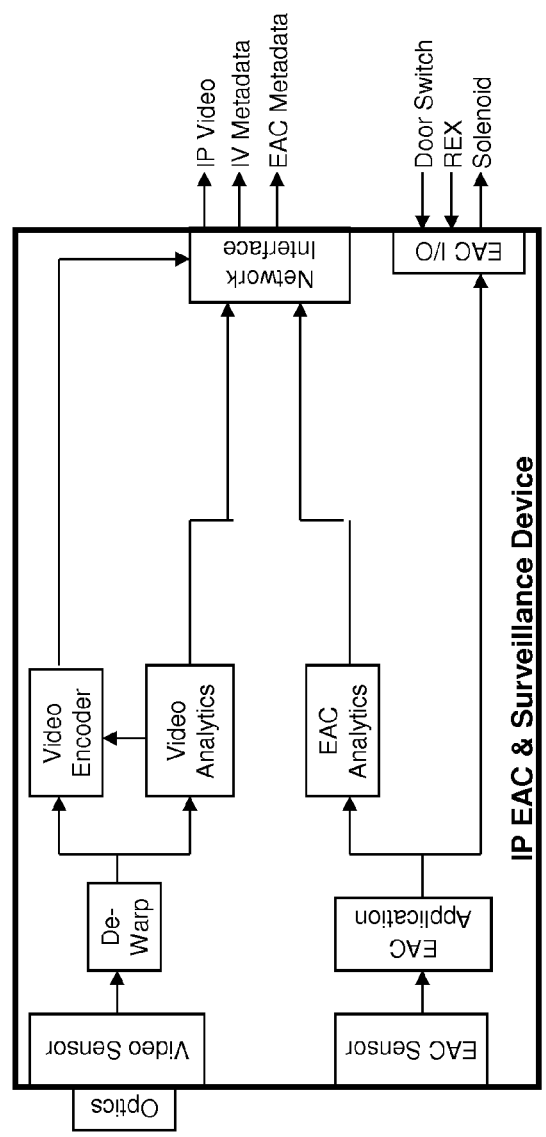
Figure Six
Integrated EAC & CCTV IP Device with On Board EAC and CCTV Analytics

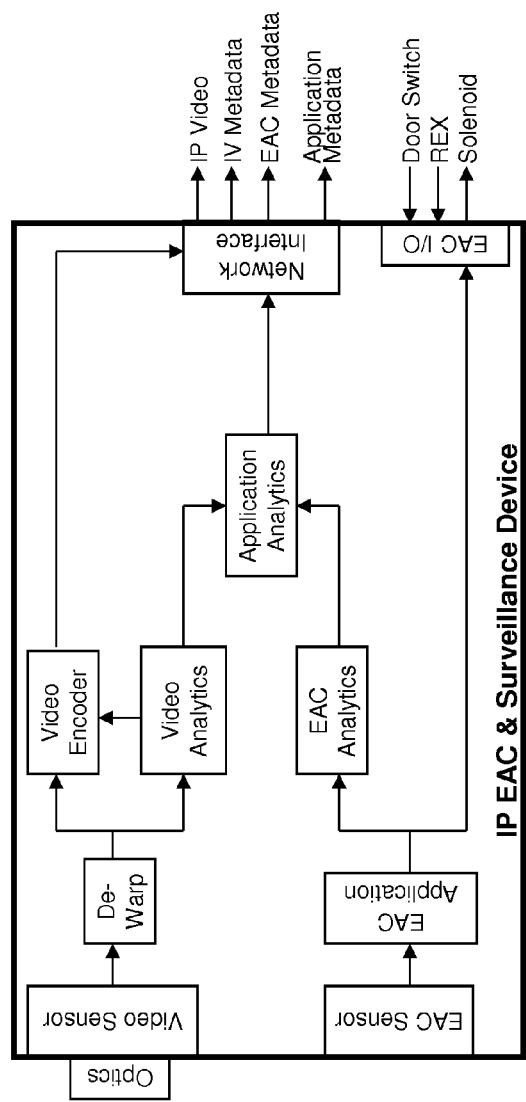

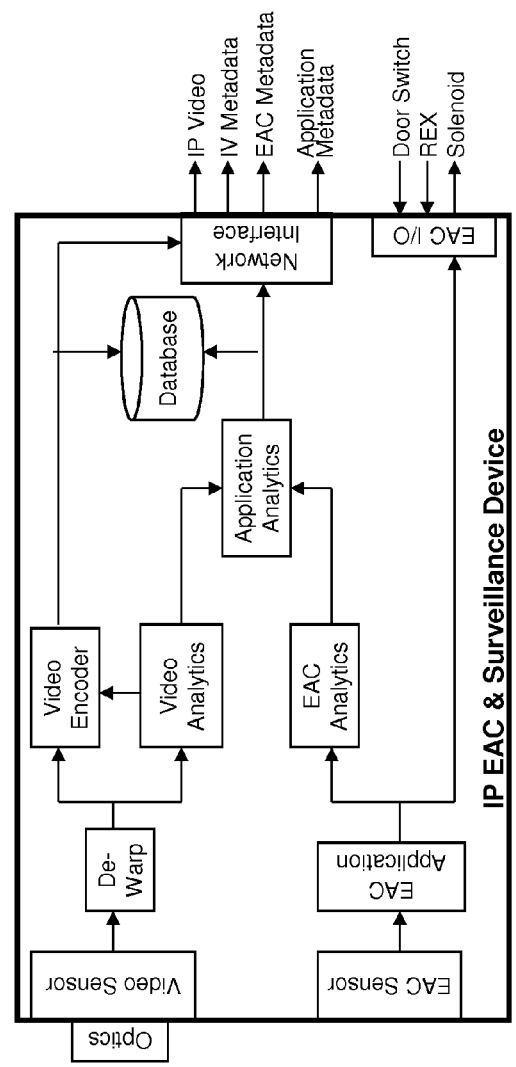
Figure Eight
Integrated EAC & CCTV IP Device with On Board Video and Data Storage

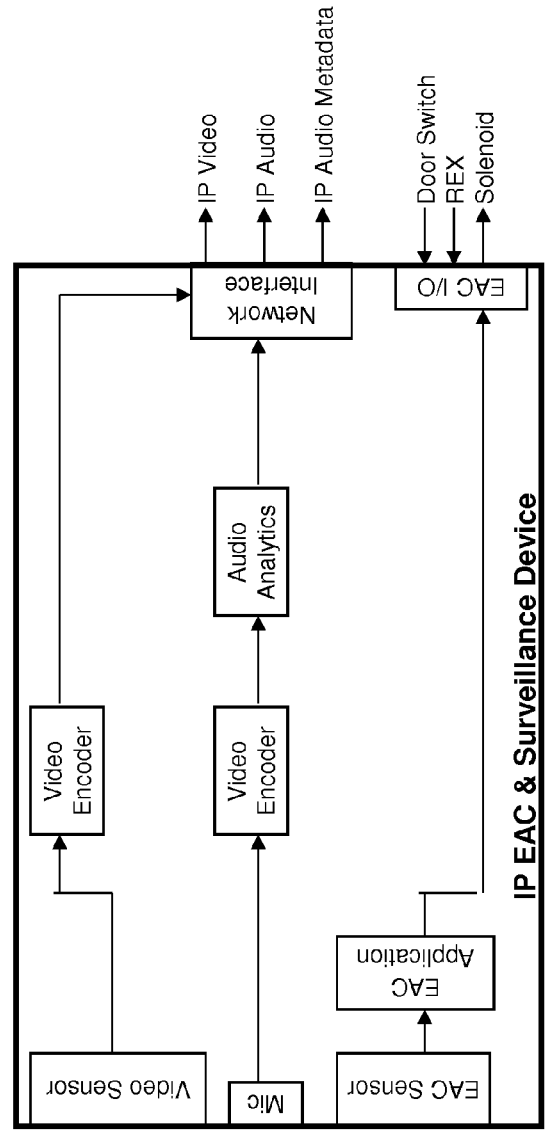
Figure Nine
Integrated EAC & CCTV IP Device with Microphone and VoIP

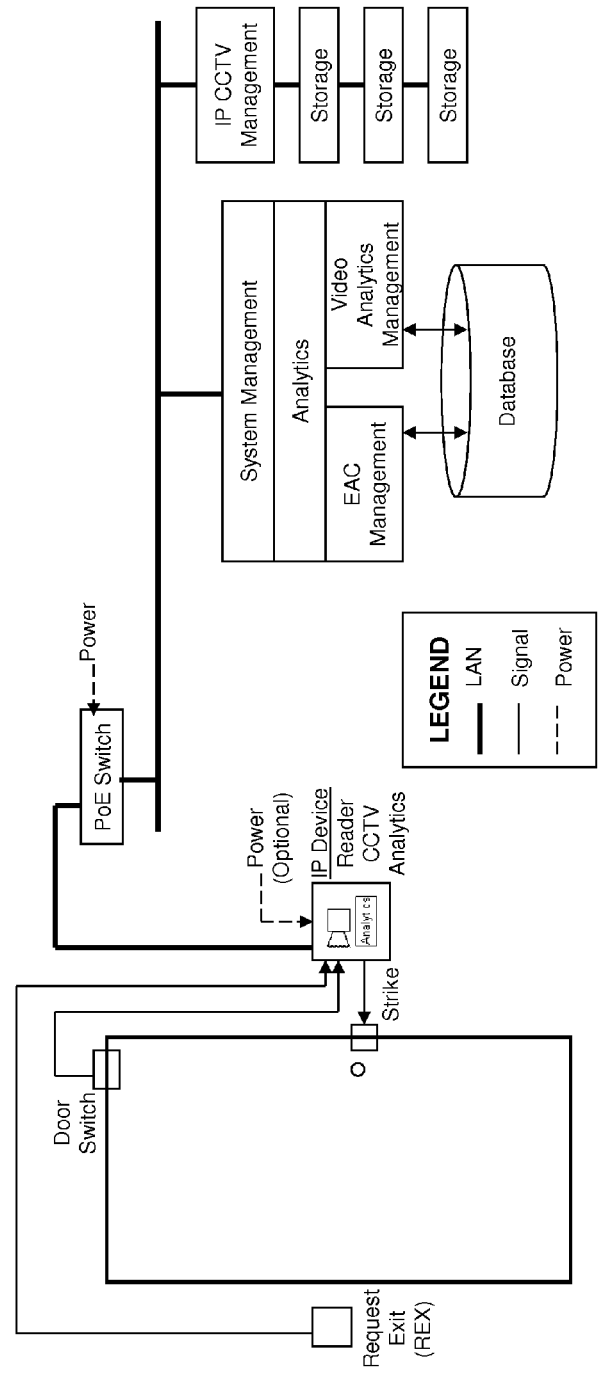
Figure Ten
Back End Management and Analytics ic physical access control and digital video surveillance, and specifically relates to the combination and integration of the two within a single IP addressable device. The invention also relates to the fields of access control analytics and video analytics operating within same device both independently and cooperatively with higher level analytical applications.

DEVICE AND SYSTEM FOR ELECTRONIC ACCESS CONTROL AND SURVEILLANCE

RELATED APPLICATIONS

This application is a continuation of allowed U.S. patent Ser. No. 12/261,201, entitled "Device for Electronic Access Control with Integrated Surveillance", the entirety of which is incorporated herein by reference. This application also claims the benefit of the earlier filing date of U.S. Provisional Patent Application Ser. No. 61/001,544, filed Nov. 5, 2007, titled "Method and Apparatus for Electronic Access Control Device with Integrated Surveillance," the entirety of which is incorporated herein by reference.

FIELD OF THE INVENTION

The present invention relates generally to the fields of electronic physical access control and digital video surveillance, and specifically relates to the combination and integration of the two within a single IP addressable device. The invention also relates to the fields of access control analytics and video analytics operating within same device both independently and cooperatively with higher level analytical applications.

BACKGROUND OF THE INVENTION

Electronic Access Control (EAC) and Closed Circuit Television (CCTV) surveillance systems have historically co-existed throughout secure installations as two functionally separate and non-communicative systems. EAC systems are designed and operated solely for the purpose of controlling physical access in to and out of secure areas. Historically the functionality has been segregated amongst several disparate components such as an input device located at the non-secure side of the portal, a field panel on the secure side that services several input devices, and a centrally located server for enrollment, administration and storage functions and cables to interconnect them.

Input devices may prompt the user attempting to gain access for one or more of the following; what you know (e.g. PIN or code), what you have (access card with magnetic strip or radio frequency [RF] proximity code) or who you are (biometric signal e.g. fingerprint or iris pattern). The communication infrastructure for EAC systems has historically followed a serial protocol (RS422 & RS485) but recently a new generation of systems has been introduced based on IP protocol and Ethernet thereby ushering in a new age of information technology (IT) with all its associated benefits. Video based surveillance systems are used to either present a live video feed to an operator (guard) for real time monitoring and response, or to feed video to storage devices (e.g. Digital Video Recorders [DVR]) for forensic review in support of post event investigation. Surveillance systems are comprised of cameras that image the area of interest and until recently output analog video (NTSC or PAL) over coaxial cables to carry the analog video signals, and video monitors and storage devices (DVRs). Like their EAC counterpart, surveillance system configuration and infrastructure has remained unchanged for decades until recently. State of the art surveillance systems are now wholly digital configurations and like EAC systems are based on IP protocols and Ethernet. Cameras produce a digital video stream (e.g. MPEG4 & H.264) that travels over network infrastructure (e.g. CAT5 or CAT6) to a digital video storage, retrieval and management system (e.g. Network Video Recorder [NVR]). Devices at the network edge (referred to as "edge device") such as IP cameras and IP card readers may also be powered by the CAT5/6 cable when operated from a Power Over Ethernet (PoE) switch, thereby eliminating the need for an external power supply at the edge device. The state of the art configurations for IP EAC and IP CCTV video are shown in FIG. One.

The common driver of the device and infrastructure transformation from analog to IP/digital is one of cost. Cost savings are realized through lower total cost of ownership by leveraging existing IT assets and know how, lower cost of installation due to a reduced number of system components, and eventually lower costs for the digital devices.

EAC and CCTV are often operational within proximity to each other, but not in a complementary fashion. For example a camera dome is often mounted in the ceiling of a corridor to surveil a hallway including the areas around one or more EAC doors. State of the art consists of two discrete systems that do not cooperate or communicate.

For well defined problems traditional EAC and CCTV systems have been combined with the aid of the emerging technology of intelligent video analytics, also known as intelligent video (IV). State of the art IV systems are located at the back end of the EAC and CCTV configurations and tie together the real time data from the EAC server and the CCTV management system as shown in FIG. Two.

For example, a tailgating violation (two or more persons pass through a secure door following a single valid access event) may be automatically detected, given properly located EAC and CCTV, by applying intelligence to the timing of events produced by the EAC and CCTV systems. The CCTV video shows the time and number of people passing through the door while the state of the various EAC sensors reveal time of card swipe and time door was opened and closed. Through automated analysis of the video stream to detect and report the number of people passing through the door and reconciliation with the state of the EAC sensors, it may accurately be determined if a tailgating violation has occurred. The IV algorithms typically require a dedicated processing platform to the support the computationally intensive task of simultaneously analyzing and correlating the EAC and CCTV data and annunciating a breech of tailgating policy.

SUMMARY OF THE INVENTION

In one aspect, the invention features a device for electronic access control and surveillance. The device includes an EAC module, and imager and a data port. The EAC module controls physical access through a portal between a secure area and a non-secure area, and generates access control data. The imager performs surveillance of an observation area proximate to the portal and generates image data and/or video data. The data port is disposed proximate to and is electrically coupled to the EAC module and the imager. The device provides at the data port a data signal comprising EAC data for the portal and at least one of image data and video data of the surveilled observation area.

In another aspect, the invention features a device for electronic access control and surveillance. The device includes an EAC module, an imager, an analytics module and a data port. The EAC module controls physical access through a portal between a secure area and a non-secure area, and generates access control data. The imager performs surveillance of an observation area proximate to the portal and generates video data. The analytics module is in electrical communication with the EAC module or the imager and receives the access control data or the video data, respectively. The analytics module generates metadata in response to the received data.

The data port is disposed proximate to and is in electrical communication with the analytics module and at least one of the EAC module and the imager. At the data port the device provides a data signal that includes metadata from the analytics module and at least one of EAC data for the portal and video data of the surveilled observation area.

In yet another aspect, the invention features a system for electronic access control and surveillance. The system includes a device for electronic access control and surveillance, a remote database and a server. The device for electronic access control includes an EAC module, an imager and a data port. The EAC module controls physical access through a portal between a secure area and a non-secure area, and generates access control data. The imager performs surveillance of an observation area proximate to the portal and generates at least one of image data and video data. The data port is disposed proximate to and is electrically coupled to the EAC module and the imager. The device provides at the data port a data signal that includes EAC data for the portal and at least one of image data and video data of the surveilled observation area. The remote database is configured for communication with the data port of the device through an intervening data network and is also configured to store the EAC data for the portal and at least one of image data and video data of the surveilled observation area. The server is in communication with the remote database and is configured to process the EAC data for the portal and at least one of image data and video data of the surveilled observation area. The server generates analytical data in response to the processed data.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

FIG. One: State of the Art IP Electronic Access Control and CCTV Configuration

FIG. Two: State of the Art Tailgating Analytics Configuration

FIG. Three: IP Device with Integrated EAC and CCTV Surveillance Capabilities

FIG. Four: Invention's IP Electronic Access Control and CCTV Configuration

FIG. Five: Integrated EAC & CCTV IP Device with Immersive Imaging and De-Warping Capability FIG. Six: Integrated EAC & CCTV IP Device with On Board EAC and CCTV Analytics FIG. Seven: Integrated EAC & CCTV IP Device with On Board Fused Application Analytics FIG. Eight: Integrated EAC & CCTV IP Device with On Board Video and Data Storage FIG. Nine: Integrated EAC & CCTV IP Device with Microphone and VoIP FIG. Ten: Back End Management and Analytics

DETAILED DESCRIPTION

The invention presented herein is for a next generation security device that integrates the functionality of EAC and CCTV into a single IP addressable device. Furthermore, analytics, such as intelligent video and application analytics, can also be integrated to fully exploit the fusion of EAC and CCTV data. The introduction of access control analytics, which has never been done before, and the combination of same EAC analytics with CCTV analytics through higher level application analytic programs provides significant advantages over current state of the art devices. By combining these capabilities in one IP device located at the network edge, the computationally intensive operations occur in real time on the highest quality data yielding the highest performance for analytical algorithms. This invention provides for a degree of situational awareness around the secure door area that is unprecedented. The invention provides for manual and automated detection and observation of all events, and is able to associate, correlate and combine data back through time and from door to door for a powerful real time threat detection and forensic search capability.

The device form factor will look and function like a state of the art IP EAC device, and will provide means for users wishing to gain access to assert one or a combination of: what they have, what they know or who they are. The device will also house an integrated CCTV camera and IP video processor for digital video surveillance and IV applications. The device may operate in solely EAC mode as an IP EAC device, solely in surveillance mode as an IP camera, or both modes simultaneously.

Each operational mode may be enhanced by analytics resident on the device. EAC analytics may be applied to EAC transactional data to produce and analyze statistics of EAC log data to reveal subtle but ominous usage patterns that may portend a looming threat. Intelligent video analytics may be applied to CCTV data to automatically characterize activity within surveillance area such as number and type of objects (people, carts . . . ), object location, speed and direction, etc. This video understanding supports video based behavior recognition and the automatic detection of slip and fall, loitering, crowd formation and dispersal, among others. Furthermore, this IV module may provide a feedback signal to the IP video module to effect real time control of video frame and compression parameters, thereby minimizing network bandwidth consumption while ensuring high quality video for priority events.

Higher level application analytics may be applied to both EAC and IV analytic modules to detect specific events such as human tailgating which requires the combination of both EAC and IV analytic data.

The device may output unique and separate data streams for each of the EAC, CCTV and application functions, or may output metadata that captures all relevant data into a single message. IP video produced by device will be associated with EAC, IV and application event data.

Integrated EAC and CCTV IP Device

The preferred embodiment of the invention consists of a form factored IP addressable device supporting EAC and CCTV functions. It is envisioned that the device is located adjacent to a door for which physical access is to be controlled in a fashion entirely consistent with state of the art IP addressable EAC input devices. Ideally the device has only one power and data connection, namely an RJ45 jack to connect to a network, several input connections to sense peripheral door sensors such as status of door contact switch and an output connection to energize the door strike. In this embodiment power is supplied to the IP device via Power over Ethernet (PoE) provided an appropriate PoE switch is used in conjunction with the device. Alternatively the device may receive power from an external source.

In its simplest configuration, the device is comprised of an EAC module, a CCTV module and a network interface module as shown in FIG. Three. The EAC module replicates the functionality of a state of the art IP EAC system and contains all necessary components to accept, verify, adjudicate, actuate and record access requests. The EAC module is comprised of a sensor for reading a user's asserted identity (e.g. magnetic strip or RF proximity), an EAC application to verify, adjudicate and log access requests, processor, database and an EAC Input/Output (I/O) module to read in status of auxiliary signals (e.g. door switch status) and actuate the door solenoid.

The CCTV module emulates the functionality of an IP camera operating in a traditional surveillance model. The module is comprised of a video sensor, control electronics to condition and optimize the video and an encoder to translate the analog video signal into a digital video stream that is suitable for transmission over the network (e.g. MPEG4, MJPEG, H.264), display and storage on a network video recorder. The video sensor may be any type that produces an image such as CCD or CMOS, and may produce video in any spectrum (e.g. visible, near infrared . . . ).

The network module conditions and manages all incoming and outgoing data and video consistent with network operation.

Independent Operational Mode

The consolidation of the EAC and CCTV functions into a single IP device at the network edge as shown in FIG. Four vastly simplifies the configuration over that of the two systems operating independently. In this simplest configuration, the two functions of EAC and CCTV may operate independently. The device may operate in solely EAC mode, solely CCTV mode, or both active together. While there are benefits to combining the data produced from each subsystem, independent operation is equally legitimate.

In EAC mode, the EAC subsystem will read an input (card, PIN, biometric), adjudicate and either grant or deny access. In either case an event log will be created and either stored locally, sent as a message back to a central server, or both. The event log will be consistent with state of the art IP EAC devices, and record access event time, door number, card or PIN identifier, biometric based user ID, door open time and duration, etc. If access is granted, the IP device may either actuate the door directly provided there is enough power available or send a signal to a relay to actuate the door solenoid.

In CCTV mode the device output will be IP video of the door area consistent with traditional IP camera operation. Video can be streamed continuously or intermittently at pre-determined fixed video frame and compression rates in compliance with surveillance policy.

Integrated EAC and CCTV IP Device with Immersive Imaging Surveillance

Sensor head and lens selection provides the flexibility to surveil a small area or an entire hemispherical area. State of the art multi-megapixel imagers furnish sufficient spatial resolution to make a single camera feasible for wide area coverage. Alternatively two or more cameras may be used. Resident hardware and software may be used to de-warp the distorted image produced by optics designed to surveil a wide area to render a more conventional landscape image in real time (FIG. Five). Door area video will be passed to a resident compression engine and then streamed over the network consistent with IP camera operation. Video will be available for real time monitoring and/or storage.

Integrated EAC and CCTV IP Device with EAC and IV Analytics

Analytics represent a powerful adjunct capability to traditional EAC and CCTV systems. While logical access control systems have seen analytics used to detect vulnerabilities and subtle attacks to the network integrity grow to a billion dollar industry, analytics has yet to reach physical EAC systems. CCTV has recently seen intelligent video analytics begin to gain traction and acceptance but is very much in its infancy. The application of EAC and CCTV analytics within the IP device presented herein is a natural and powerful extension of the invention. EAC analytics and CCTV analytics may run on the EAC and CCTV data paths respectively as shown in FIG. Six.

Resident EAC analytics may enhance EAC efficacy by collecting and analyzing statistical data of EAC events for the door in question. Searching for event data patterns and trends may provide insight to systemic policy breeches and through extrapolation of statistical trends may even predict the probability of policy breeches yet to occur.

Resident CCTV analytics will continuously monitor the area surrounding the door for specific behaviors. State of the art CCTV analytics are able to detect: people counting, slip and fall, crowd formation and dispersion, running, traveling in an unauthorized direction, and erratic behavior among others. Some or all of these behaviors and new ones can be preset to run within the presented invention continuously or can be instantiated in response to CCTV, EAC or external sensor input.

Independent Operational Mode with EAC and IV Analytics

The EAC analytics will produce metadata and alerts based on analysis of real time and historical access attempts in compliance with pre-determined criteria.

Analytics is particularly well suited to the video sensor. State of the art IP cameras do have rudimentary on board IV analytics, but to date no EAC device with integral camera does. The CCTV analytics will produce metadata and alerts based on pre-determined IV behaviors such as loitering, slip and fall, crowd formation or dispersion, running and erratic behavior.

Video analytics can also be used to improve the efficiency of the IP device invention through a reduction in network bandwidth consumption. Establishing a priority for video streams based on video content analysis enables intelligent and dynamic control of video parameters for specific regions of the field of view. This will ensure high quality (high frame rate, low compression) video is available to support improved man-in-the-loop viewing (guard at monitor) and automated processing via video analytics (higher probability of correct alarm and lower false alarm). Furthermore, intelligent management of video stream size and speed will vastly improve scalability as more devices can be operated on a common network; while at the same time reduce network bandwidth consumption and video storage requirements.

For example, during a period of low or no activity an idle mode may stream low frame rate and highly compressed video of the entire wide area field of view. But when there is an event of interest, the IV may declare a priority mode and direct a high frame rate and low or no video compression stream of just the area of primary interest such as the area immediately surrounding a person as she walks bye.

Integrated EAC and CCTV IP Device with combined EAC, IV and Application Analytics High level application analytics resident on the device data may take advantage of the complementary EAC and CCTV data and analytics to solve problems more complex than those that can be address by considering the data sets separately. Currently application analytics state of the art provides a means to combine EAC and CCTV data at the back end servers to automatically detect tailgating violations. With the multifunction IP device described herein, all the necessary hardware and software components reside on the device itself located at the network edge. For example, the state of EAC sensors as reported by the EAC Module indicates asserted identity of card and user, door location, time and duration of door open status, etc. . . . The raw CCTV video data from the IP Video Module is passed to a Video analytics Module to compute the location, speed, direction and number of people within proximity to the door. The EAC module and the Video Analytic module together feed data to the tailgating analytics application and all work harmoniously together within the device (see FIG. Seven).

Real time tailgating alert messages may be sent over the network with associated user ID from the EAC and associated video clip of tailgating event from the CCTV and IV to put all the relevant event data in a concise package.

Other analytics may be employed as well, such as association of like events over time and association of dissimilar events including loitering detection, slip and fall detection, crowd detection, and people counting. For example, a forensic analysis of the CCTV event data will produce a history of loitering events. This can be reconciled with a forensic analysis of the EAC event data and may reveal a correlation with failed access attempts indicating somebody is determined to gain unauthorized access. Finally, the loitering event history may be reconciled with tailgating event history, thereby validating suspicion that somebody was loitering in preparation for opportunity to tailgate.

Local Storage and Retrieval

While each EAC and CCTV module and associated analytic modules may have data storage capability as required to support the implementation, it is also feasible and attractive to have additional storage to provide "store and forward" flexibility on data transfer back to the central server as depicted in FIG. Eight.

Integrated EAC and CCTV IP Device with microphone. Voice over IP and Audio Analytics The device may also feature a microphone and voice over IP module so that users at the door may talk to and be heard by administrators monitoring the system. Audio signals will be conditioned for transmission over the IP infrastructure by the Voice over IP (VoIP) module. The subsystem is depicted in FIG. Nine.

The audio channel will facilitate more efficient exception handling. For example, when a user is denied access at the door, an alert may automatically be generated to alert an administrator. The administrator may be presented with real time audio and video from the door in question for superb situational awareness. Furthermore, audio analytics are well suited to automatically detect sounds that may require a response. Each door equipped with this feature can be considered a listening point. Analytics may continuously monitor for loud or sudden human voices, bangs, etc. Speech recognition may be applied to recognize calls for help and other signs of distress. If two or more devices are within listening range to each other, a rough location of the sound of interest may be ascertained through analysis of signal strength, timing and other parameters.

Central Server for Real Time and Forensic Enterprise Analytics

At the security center is a central server and event database (FIG. Ten). The server collects the activity from each device presented in the invention and either automatically, manually, or both organizes, associates, correlates and otherwise resolves usage trends that collectively yield insights into the enterprise. The server supports manual (man in loop) and automated (pre-defined) forensic queries through the EAC, EAC analytics metadata, CCTV, intelligent video metadata, audio, audio analytics metadata and high level analytics data. The server also facilitates construction of new real time policies to be applied to all forms of data produced by each device and from device to device throughout the enterprise.

Example of Intended Use

The device described in this invention is mounted adjacent to a secure door in an enterprise environment just as an EAC card reader would be. The device is continuously imaging the area up and down the hallway from a range of zero to about twenty feet in an Omni-directional fashion. Every event is analyzed by the video analytics and in tested against the prevailing security policy. The prevailing policy requires a statistical count of how many people walk in each direction per hour. Also, a real time alert is to be sent to the security center in the event a crowd is formed, or running or erratic behavior is detected.

Two people pass through the secure door following a single access request. The device automatically detects the event in real time by examination of the EAC data and video analytics supporting a human tailgating application. In compliance with policy, an alert is sent to the security center that contains all the relevant EAC and video data to completely capture the event. The guard's attention is brought to the event and he informs human resources. A meeting is subsequently conducted with the authorized card holder, identified by the card ID, to determine if the tailgating was complicit or inadvertent. The unauthorized user is also questioned and the two accounts corroborated. The video record makes identification of the individuals possible and repudiation difficult. Each interviewee tells the truth and pledges to adhere to the access policy.

While the invention has been shown and described with reference to specific embodiments, it should be understood by those skilled in the art that various changes in form and detail may be made therein without departing from the spirit and scope of the invention as recited in the accompanying claims.

What is claimed is:

1. A device for electronic control and surveillance, comprising:
   an electronic access control (EAC) module, comprising a reader sensor that reads access request data, wherein the EAC module generates access control data in response to receiving the access request data, the access control data having an authorization result establishing whether to authorize passage through a portal between a first area and a second area;
   a surveillance device for continuously surveilling an observation area proximal to the portal at least prior to a detection of an entry through the portal and prior to access being granted or denied in response to a presentation of the access request data or in the absence of the access request data, the surveillance device generating surveillance data related to the continuous surveillance of the observation area, the surveillance data including data related to a presence of people, objects, or a combination thereof at least one of at the observation area proximate to the portal and passing through the portal, the surveillance device generating at least one of image data, video data, and audio data;
   an analytics module that compares a combination of the access request data, the surveillance data, and the access control data to determine whether the surveilled people, objects, or a combination thereof are authorized to pass through the portal;
   a housing proximate to the portal, wherein the EAC module and the analytics module are co-located in the housing proximate to the portal.

2. The device of claim 1, wherein the electronic access control (EAC) module determines an open or closed state of the portal between the first area and the second area.

3. The device of claim 2, wherein when the portal is in the closed state, the analytics module determines from the comparison that the number of people or objects detected from the surveillance data is greater than that of the access request data or the absence of the access request data, the analytics module generates a signal indicating that a breach has occurred.

4. The device of claim 1, wherein the EAC module authorizes access from one of the first area and the second area to the other of the first area and the second area.

5. The device of claim 1, wherein the EAC module generates the authorization result in response to a comparison between the surveillance data and at least one of the access request data and pre-determined EAC criteria.

6. The device of claim 1, wherein the surveillance device is co-located with the EAC module and the analytics module in the housing.

7. The device of claim 1, wherein the surveillance device comprises at least one of an imager and an acoustic detection device.

8. The device of claim 1, wherein the acoustic detection device comprises a sensor, wherein the analytics module includes analytics data generated in response to sound detection data received at the sensor.

9. The device of claim 1, further comprising a data port, wherein at least one of analyzed surveillance data and the access control data includes metadata that is output from the data port.

10. A device for electronic access control and surveillance, comprising:
   an electronic access control (EAC) module, comprising; a reader sensor that reads access request data, wherein the EAC module is constructed and arranged to generate access control data in response to receiving the access request data, the access control data having an authorization result establishing whether to authorize passage through a portal between a first area and a second area;
   a surveillance module constructed and arranged to receive surveillance data;
   an analytics module that analyzes at least one of the surveillance data and the access control data;
   a housing, wherein the EAC module and the analytics module are co-located at the housing at a region proximal the portal.

11. The device of claim 10, wherein the surveillance module communicates with at least one of an image, video or acoustic sensor that is external the housing.

12. The device of claim 10, further comprising a storage that stores at least one of the access control data, the access control analytic data, the surveillance data, and the surveillance analytic data.

13. The device of claim 10, further comprising an input/output (I/O) module that is constructed and arranged to communicate with at least one of a sensor and a transducer that is remote from the housing.

14. The device of claim 13, wherein the transducer actuates a locking device for at least one of securing or un-securing the portal.

15. The device of claim 10, wherein the access control data is combined with the surveillance data to associate a time and nature of a surveillance with an access attempt.

16. The device of claim 10, wherein the analytics module analyzes at least one of the access control data and historical access control data to at least one of establish a baseline or pattern of usage activity and support analysis of usage activity.

17. The device of claim 10, wherein the surveillance data is generated in response to analytics module analyzing the access control data.

18. The device of claim 10, wherein the analytics module generates surveillance analytic data in response to analyzing the surveillance data at least prior to a detection of an entry through the portal or in the absence of an entry through the portal.

19. The device of claim 18, wherein the surveillance analytic data includes at least one of image metadata, video metadata, or acoustic metadata.

20. The device of claim 10, wherein the analytics module generates surveillance analytic data in response to analyzing the surveillance data, and wherein the analytics module further analyzes a combination of the surveillance analytic data and the access control data.

21. The device of claim 10, wherein the analytics module analyzes a combination of access control analytic data generated in response to the access control data and surveillance analytic data generated in response to the surveillance data.

22. The device of claim 10, wherein the analytics module analyzes the at least one of the access control data and the surveillance data in response to at least one of an automated analytic process and a manually assisted analytic process.

23. A system for electronic access control and surveillance, comprising:
   a device for electronic access control and surveillance, the device comprising:
      an electronic access control (EAC) module, comprising a reader sensor that reads access request data and in response generates access control data, wherein the EAC module is constructed and arranged to generate access control data in response to receiving the access request data, the access control data having an authorization result establishing whether to authorize passage through a portal between a first area and a second area;
      a surveillance module constructed and arranged to receive surveillance data, and
      a housing, wherein the EAC module and the surveillance module are co-located at the housing at a region proximal the portal; and
   a server in communication with the device, wherein at least one of the device and the server analyzes at least one of the surveillance data, the surveillance analytic data, the access control data and the access control analytic data.

24. The system of claim 23, wherein the device further includes an input/output (I/O) module that is constructed and arranged to communicate with a sensor or transducer that is remote from the housing.

25. The system of claim 23, further comprising a storage that stores at least one of the access control data, the access control analytic data, the surveillance data, and the surveillance analytic data.

26. The system of claim 23, wherein the device for electronic access control and surveillance comprises a plurality of devices, each device in communication with at least one of the database and the server.

27. The system of claim 23, further comprising an analytics module positioned in the housing that analyzes at least one of the surveillance data and the access control data.

* * * * *